(12) United States Patent
Haber

(10) Patent No.: US 6,593,551 B2
(45) Date of Patent: Jul. 15, 2003

(54) USER SENSING CHAFING DISH

(76) Inventor: Robert Haber, 825 E. 140th St., Bronx, NY (US) 10454

(*) Notice: Subject to any disclaimer, the term of this patent is extended or adjusted under 35 U.S.C. 154(b) by 0 days.

(21) Appl. No.: 09/900,719

(22) Filed: Jul. 9, 2001

(65) Prior Publication Data

US 2002/0005402 A1 Jan. 17, 2002

Related U.S. Application Data

(60) Provisional application No. 60/218,151, filed on Jul. 14, 2000.

(51) Int. Cl.$^7$ ............ A47B 31/02; A47J 36/24; A47G 23/04
(52) U.S. Cl. ............ 219/430; 219/214; 219/385; 219/386
(58) Field of Search ............ 219/430, 432, 219/433, 429, 385, 386, 435, 214; 220/252, 827, 830

(56) References Cited

U.S. PATENT DOCUMENTS

| 76,639 | A | * | 4/1868 | Lawrence | 220/252 |
|---|---|---|---|---|---|
| 4,320,849 | A | * | 3/1982 | Yellin | 220/252 |
| 5,597,500 | A | * | 1/1997 | Hasenfratz et al. | 219/385 |
| 5,788,196 | A | * | 8/1998 | Forman | 220/252 |
| D426,103 | S | * | 6/2000 | Briner | D7/355 |
| 6,302,684 | B1 | * | 10/2001 | Woo et al. | 432/250 |
| 6,305,270 | B1 | * | 10/2001 | Wang | 99/336 |

FOREIGN PATENT DOCUMENTS

| CH | 674608 | * | 6/1990 |
|---|---|---|---|
| GB | 2360689 | * | 3/2001 |

* cited by examiner

Primary Examiner—Joseph Pelham
(74) Attorney, Agent, or Firm—Charles E. Temko

(57) ABSTRACT

A chafing or warming dish construction typically used for buffet serving of comestibles having user sensing means which automatically opens and closes an overlying cover depending upon the presence of the user at a serving table. In a disclosed embodiment, the cover is arranged for pivotal rotation about a pair of aligned pintles.

3 Claims, 6 Drawing Sheets

USER SENSING CHAFING DISH

RELATED APPLICATION

Reference is made to my copending provisional application, Ser. No. 60/218,151 filed Jul. 14, 2000, to which a claim of priority is made.

BACKGROUND OF THE INVENTION

This invention relates generally to the field of food serving dishes or bowls typically used for buffet type serving by restaurant and similar facilities, and snore particularly to an improved form of chafing device adapted to preserve the contents at a predetermined heated temperature over a substantial period of time.

It is known in the art to provide chafing dish devices having a base element adapted to be supported by a serving table along with similar devices containing other items of food. Means in the form of replaceable trays are selectively engaged upon the base element with a fresh supply of a particular food as the contents of an installed tray are removed. The base element includes a movably supported cover usually pivotally engaged along an edge thereof which is manually opened by a user to permit access to the contents of the tray, following which the cover is manually closed. In some cases, the cover is counterbalanced to remain in relatively open condition. In the case of relatively larger base elements there is provided heating means, typically using solid alcohol fuel to replace heat lost from the food during the period in which the cover is opened.

Such devices have been known in the art for many years. The principal problem from the standpoint of a user is that he or she, prior to opening the cover, is already carrying at least one plate or dish, and must perform the operation of opening the cover, transferring a desired portion of food, and closing the cover with another hand, as well as replacing a serving implement while maintaining the plate or plates in horizonal orientation. As a result, the user, particularly if elderly, often chooses or neglects to close the cover which remains in opened condition until the arrival of the next user, with undesirable heat loss in the remaining contents of the tray.

SUMMARY OF THE INVENTION

Briefly stated, the invention contemplates the provision of an improved chafing dish construction which addresses the above-described problem. To this end, the described embodiment provides for the sensing of the presence of a user proximate to the table area supporting the chafing dish, and using this information to initialize the operation of mechanical means for opening the cover, and maintaining the same in open condition until the user has moved away from the sensed location, at which point the means serves to close the cover pending the arrival of a subsequent user or service personnel. A time delay is provided to function where the subsequent user arrives within a relatively short time increment. The cover element is of arcuate configuration and is mounted for pivotal movement about its axis, motivated by a battery powered motor which drives a side mounted cog belt which is entrained on a corresponding cog pulley on the axis of rotation of the cover. The belt carries cams which operate electrical switches controlling operation of the motor. The motor and its rechargeable batteries are preferably mounted within an insulated enclosure to dampen operational noise and are connected to the cog belt through a flexible-coupling. The presence of a user is sensed by known passive infra-red sensing means located at the front of the device and in a position so as not to be affected by heating means disposed beneath the replaceable tray which supports the food, Means is also provided for disconnecting the motor in the event that a user attempts to close the cover during a period of time delay. During normal use, the cover element will be pivoted through approximately a ninety degree or one-hundred eighty degree arc with the principal axis of rotation disposed parallel to the principal axis of the food tray.

BRIEF DESCRIPTION OF THE DRAWINGS

In the drawings, to which reference will be made in the specification, similar reference characters have been employed to designate corresponding parts throughout the several views.

DETAILED DESCRIPTION OF THE DISCLOSED EMBODIMENT

Figure 1:
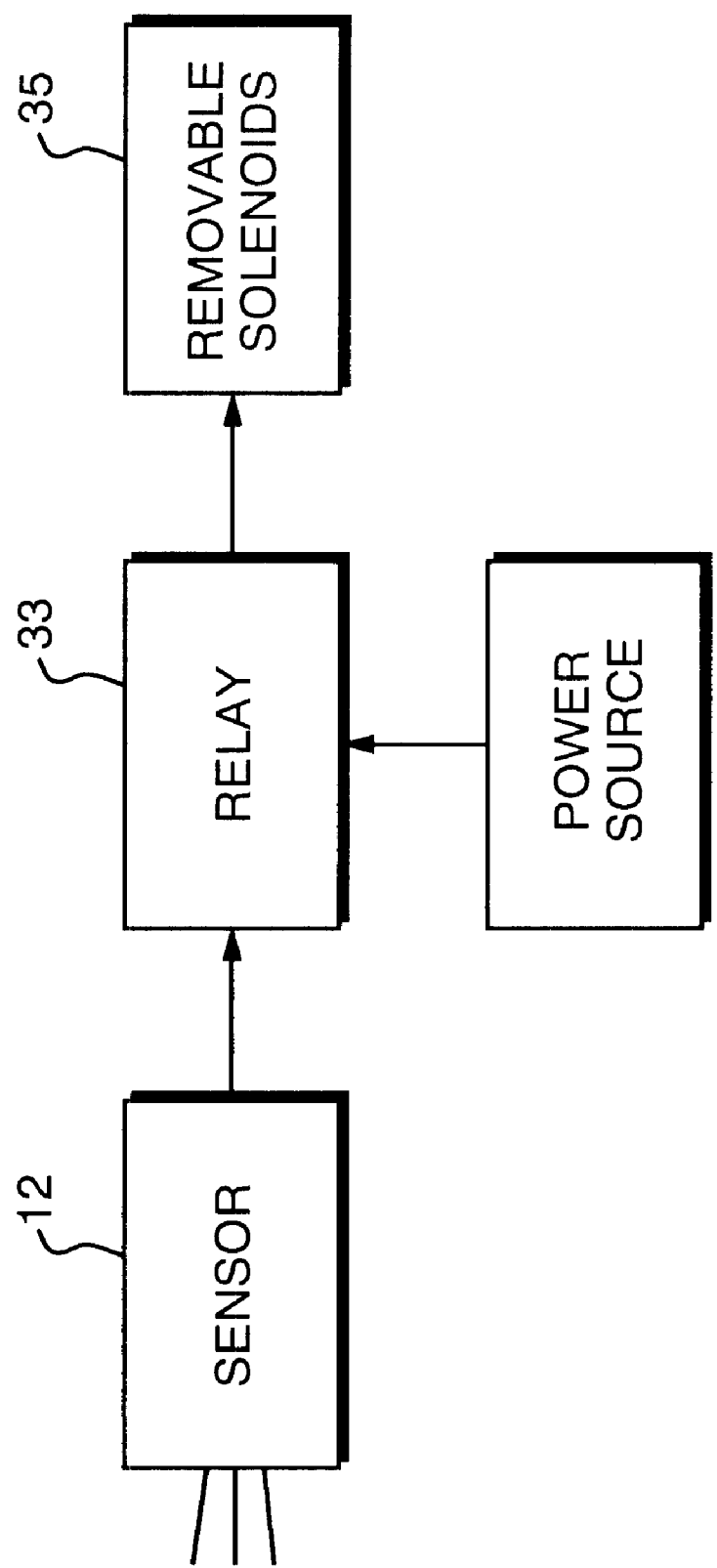
FIG. 1 is a block diagram showing the electro-mechanical elements comprising the disclosed embodiment of the invention.
Figure 2:
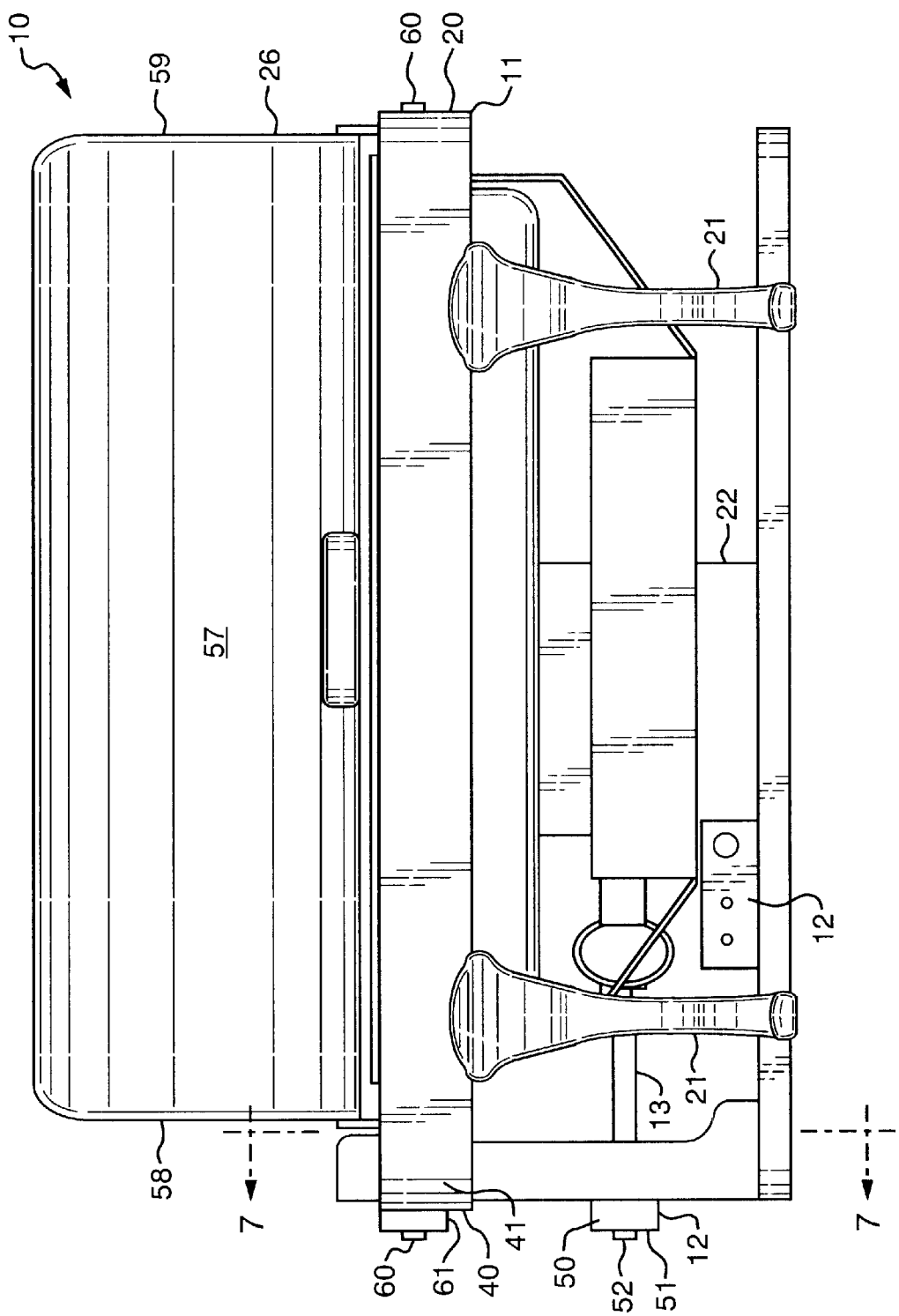
FIG. 2 is a front elevational view of an embodiment of the invention.
Figure 3:
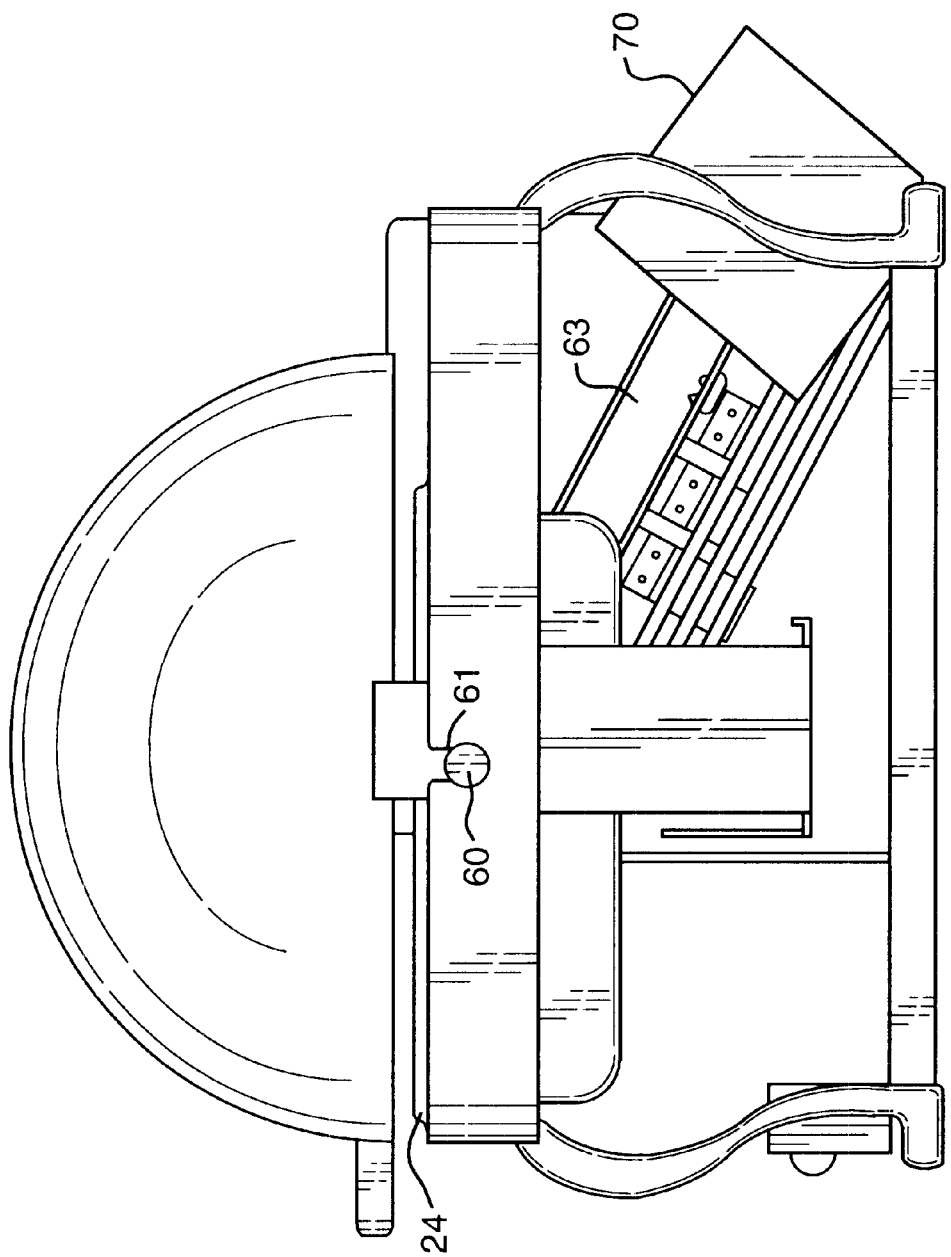
FIG. 3 is a side elevational view thereof.

In accordance with the first embodiment of the invention, the device, generally indicated by reference character 10, comprises broadly, a chafing dish 11, user sensing means 12, and powered linkage means 13.

The chafing dish 11 is of generally conventional construction, including a base element 20 including a plurality of legs 21 forming a space above a supporting table for the accommodation of optional heating means 22. The body of the base element 20 includes a recess 23 accommodating a replaceable tray 24, periodically replaced as the contents of the tray are consumed. Pivoting means 25, in the form of axially disposed pintles supports a cover element 26 and an optional counterweight means which reduces the degree of applied force necessary to raise the cover element and maintain it in raised condition.

The sensing means 12 typically includes a known passive infrared scanning device 30 which will generate and transmit a positive signal upon detecting the presence of a user adjacent the supporting table. Scanning devices of this type are well known in the art, and are widely used as part of home intrusion detecting devices in the present embodiment, the sensitivity of the sensor is adjusted so that the generation of a signal requires the presence of a user within approximately two feet of the chafing dish, to prevent constant operation caused by persons walking in the vicinity of the supporting table. The arcuate path of the projected infrared beam is initially adjusted so as not to sense a subsequent user positioned opposite an adjacent chafing dish until the person is opposite the device 10. A transmitted signal is received and transmitted to electrically powered relay 33 which serves to activate powered drive train means 35 described hereinafter. The relay remains closed so long as a sensor signal is received to maintain the cover in opened condition.

Upon the cessation of receipt of the sensor signal, the relay unlocks and returns to a second position wherein current is directed to the drive train in an opposite direction to cause the cover to close. This type of operation presumes power from a direct current source, typically a small battery. Where the device is powered by alternating current, typically from a wall or floor outlet, the relay unit may include a direct current rectifier, also known in the art.

Figure 4:
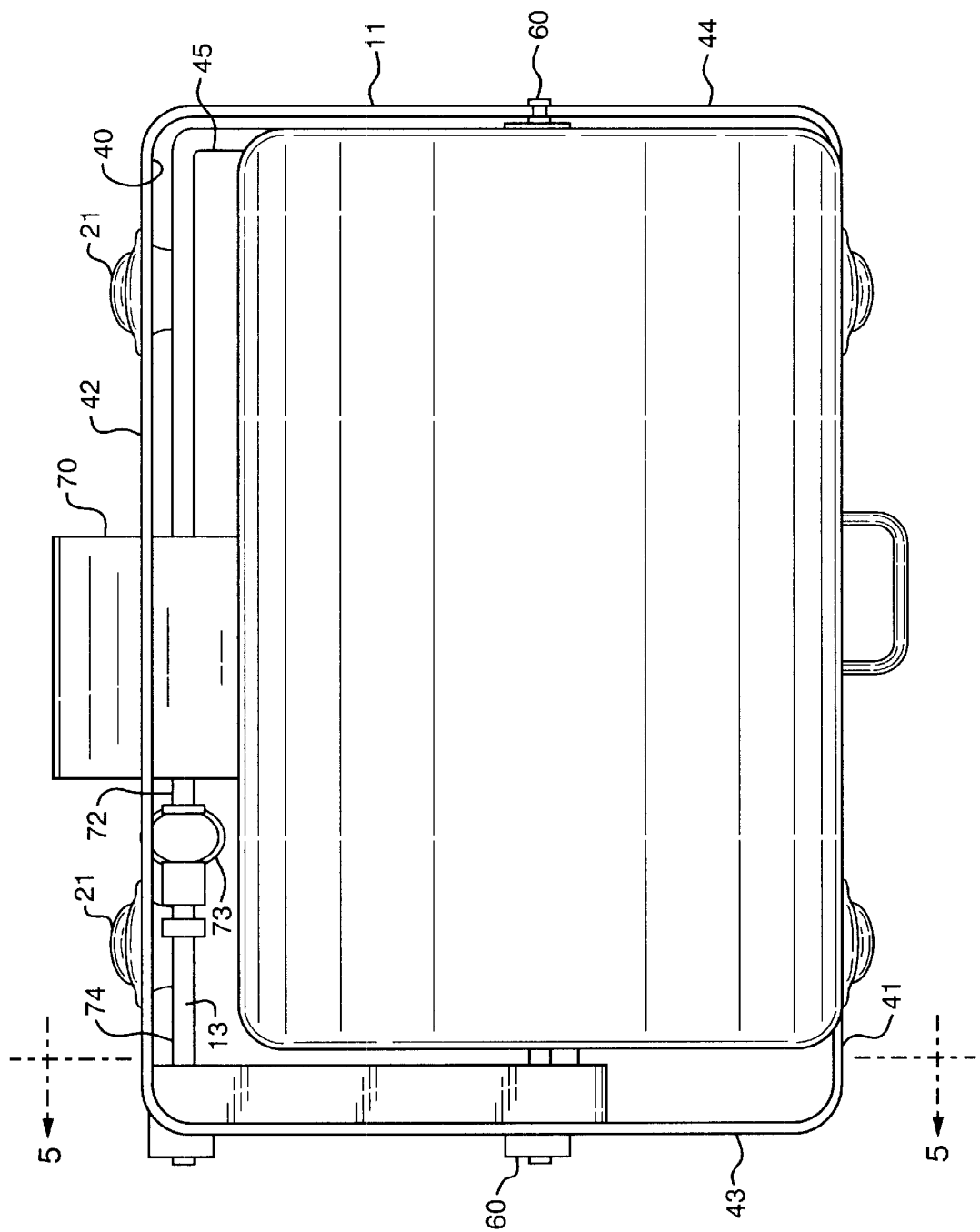
FIG. 4 is a top plan view thereof.
Figure 5:
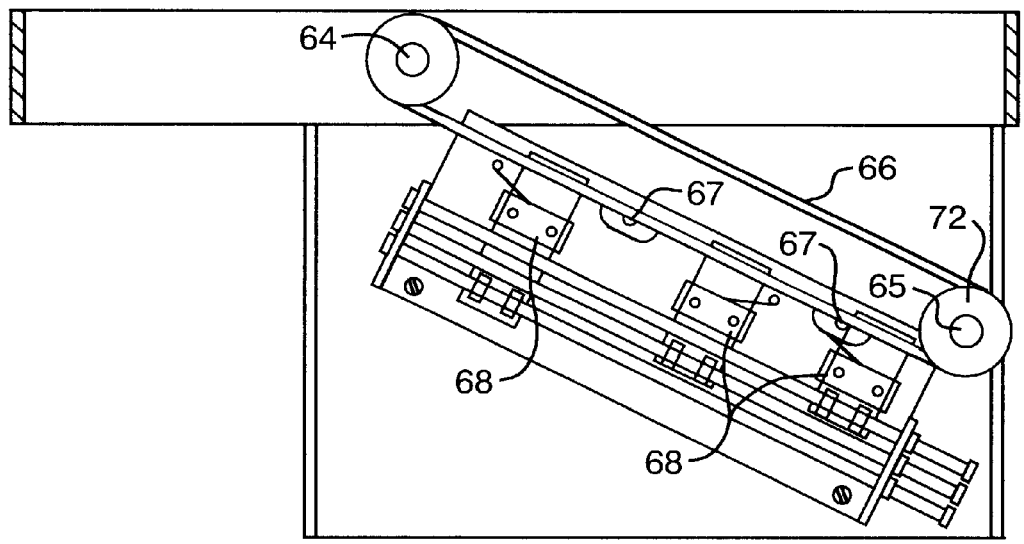
FIG. 5 is a sectional view thereof as seen from the plane 5—5 in FIG. 4.

Referring to FIG. 4, et seq., the dish 11 includes a generally rectangular frame 40 having a front rail 41, a rear rail 42, and side rails 43 and 44 which are supported on upstanding legs 21. A continuous flange 45 supports the replaceable tray 24.

The sensing means 12 is preferably enclosed within a generally rectangular enclosure. 50, a front wall 51 of which mounts a fresnel lens 52 which transmits light to a known passive infrared circuit board (not shown) which may also mount the relay communicating with the linkage means 13. The cover element 26 is preferably of arcuate configuration, including a main wall 57 and end walls 58 and 59. A pair of pintles 60 are selectively engaged within corresponding recess 61 and 62 wherein a spline type engagement permits total removal of the cover element as required. A vertical support 63 mounts first and second cog members 64 and 65 entraining a cog belt 66 carrying a plurality of cams 67 which selectively operate corresponding switches 68.

The linkage means 13 includes a motor enclosure 70 which also contains rechargeable batteries (not shown). An output shaft 72 mounts a flexible coupling 73 transmitting motion to a connecting shaft 74 which mounts the first cog member 65.

Operation

Commencing with the cover element in closed condition, operation of the device is commenced by closing a main switch (not shown) which powers the sensing means which continuously adjusts to the level of the ambient temperature to enable sensing of the presence of a user opposite the device. Upon detection, the sensing means operates the above-mentioned relay, driving the motor in a first direction to result in pivoting the cover element through approximately ninety degrees to access the contents of the food tray. At the end of the path of rotational travel, one of the switches 68 is opened by a corresponding cam 67 to interrupt passage of current to the motor. This condition obtains until the user has served himself and moves away, at which time the sensing means detects his departure. The relay means then operates to send current in an opposite direction to the motor which results in the return of the cover element to closed condition. The limit of this pivotal movement is determined by the opening of a second switch 68 by a second cam 67. The cycle is repeated upon the detection of a second user. The same cycle may be used by service personnel when replacing a food tray. Power may be disconnected while the cover is in opened condition at 180 degrees by a third switch which senses an attempt by a user to close the cover himself, at which point the user will sense sufficient resistance to discontinue his effort or a sensor (not shown) will reverse the current to the motor. Preferably, the cover element does not include a manually engageable handle as is present in prior art devices.

If desired, the sensing means may include a capacitive type delay which will maintain the cover in opened condition for a short period of time after the user departs, during which time a second user may be detected by the sensing means.

Figure 7:
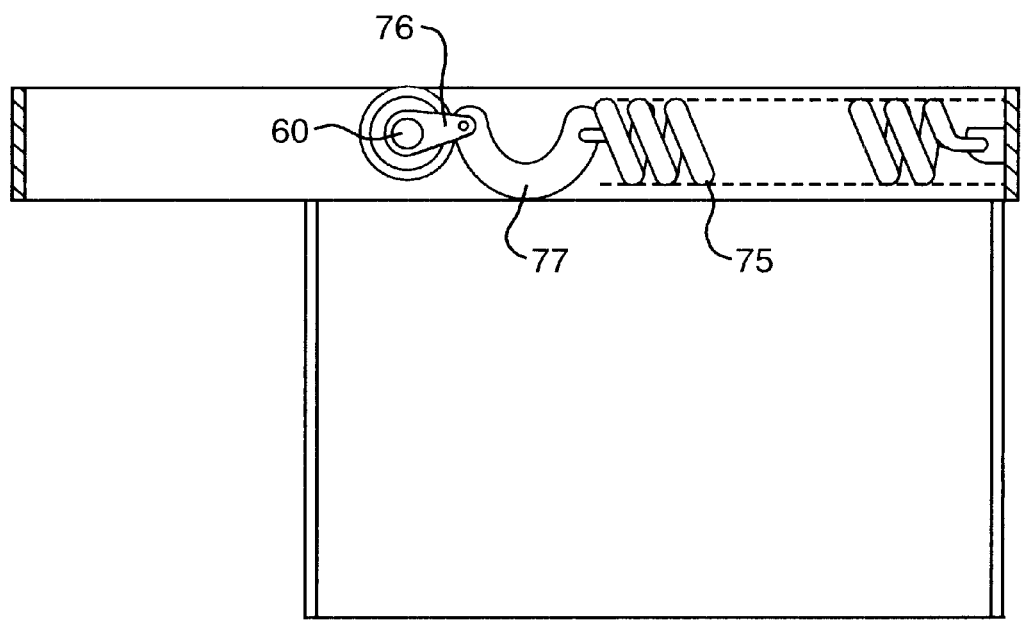
FIG. 7 is a sectional view showing a lid counterbalance means, as seen from the plane 7—7 in FIG. 2.
Figure 6:
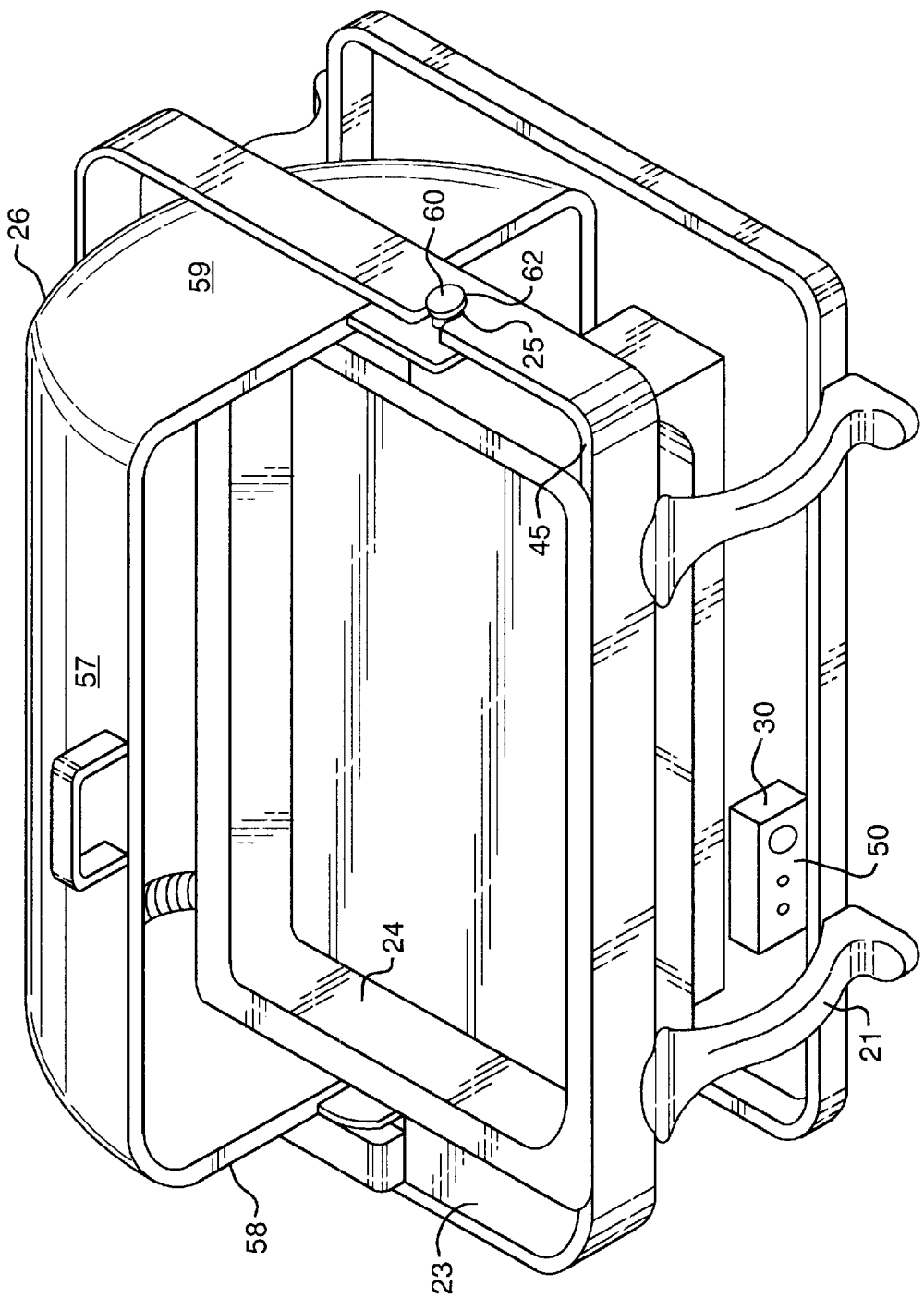
FIG. 6 is a perspective view showing a cover element in altered relative position.

Since the cover element is arranged for rotational movement through approximately ninety degrees, a counter balance force is necessarily progressive, and is best performed by a coil spring 75 (FIG. 7) cooperating with a lever 76 carried by the driven pintle 60 and a curved link 77.

I wish it to be understood that I do not consider the invention to be limited to the precise details of structure shown and described in the specification, for obvious modifications will occur to those skilled in the art to which the invention pertains.

I claim:

1. In a chafing dish having a base element, a cover element overlying said base element for selective movement between opened and closed positions, electrically powered linkage means interconnecting said base element and said cover element for relative movement between opened and closed positions, the improvement comprising: sensing means for detecting the presence of a standing user approaching said dish, and transmitting a signal corresponding to a detected presence; and relay means for receiving said signal corresponding to a detected presence for initiating said selective movement; said sensing means being located adjacent said dish to project a user-detecting means in a horizontal plane upon the body of said user as said user approaches a predetermined area alongside said dish, and maintaining said signal at least until his departure from said area.

2. A chafing dish in accordance with claim 1, in which said sensor is if infrared type.

3. A chafing dish in accordance with claim 1, in which said lid element is counterbalanced to maintain a given position relative to said base element.

* * * * *